(12) United States Patent
Etin

(10) Patent No.: US 12,377,634 B2
(45) Date of Patent: Aug. 5, 2025

(54) COMPOSITE SHEET AND MANUFACTURING METHOD FOR A FOAMED DECORATIVE SHEET FREE OF PVC AND PLASTICIZERS

(71) Applicant: DG DIMENSE, UAB, Vilnius (LT)

(72) Inventor: Aleksey Etin, Vilnius (LT)

(73) Assignee: DG DIMENSE, UAB, Vilnius (LT)

( * ) Notice: Subject to any disclaimer, the term of this patent is extended or adjusted under 35 U.S.C. 154(b) by 0 days.

(21) Appl. No.: 18/114,245

(22) Filed: Feb. 25, 2023

(65) Prior Publication Data

US 2023/0202133 A1 Jun. 29, 2023

Related U.S. Application Data

(60) Division of application No. 15/251,771, filed on Aug. 30, 2016, now abandoned, which is a continuation of (Continued)

(30) Foreign Application Priority Data

Mar. 6, 2014 (EP) .................................... 14158061

(51) Int. Cl.
- *B32B 5/24* (2006.01)
- *B32B 5/20* (2006.01)
(Continued)

(52) U.S. Cl.
CPC ............... *B32B 5/245* (2013.01); *B32B 5/20* (2013.01); *B32B 27/12* (2013.01); *B32B 29/007* (2013.01); *C08J 9/0066* (2013.01); *C08J 9/10* (2013.01); *C08J 9/103* (2013.01); *C08K 3/22* (2013.01); *C08K 3/26* (2013.01); *D06N 3/005* (2013.01); *D06N 3/045* (2013.01); *D06N 7/0002* (2013.01);
(Continued)

(58) Field of Classification Search
CPC ....................................................... B32B 5/245
See application file for complete search history.

(56) References Cited

U.S. PATENT DOCUMENTS 3,715,264 A 2/1973 Burton
4,427,731 A 1/1984 Gibson
(Continued)

FOREIGN PATENT DOCUMENTS

JP 2002096433 A 4/2002
JP 2003089172 A 3/2003
(Continued)

OTHER PUBLICATIONS

International Preliminary Report on Patentability dated Sep. 6, 2016 of international patent application PCT/EP2015/050975 on which this application is based.
(Continued)

*Primary Examiner* — Andrew T Piziali
(74) *Attorney, Agent, or Firm* — Ewers IP Law PLLC; Falk Ewers

(57) ABSTRACT

A composite sheet and a method for producing a decorative sheet using the composite sheet are provided. The composite sheet has a base layer and a foamable layer bonded to the base layer. The foamable layer includes 100 parts by weight of a polyolefin material having an elastic modulus of <0.1 GPa, 0.1-10 parts by weight of a foaming agent, and 0-200 parts by weight of additives. The foamable layer has a thickness of 0.05 to 0.3 mm.

9 Claims, 3 Drawing Sheets

Related U.S. Application Data application No. PCT/EP2015/050975, filed on Jan. 20, 2015.

(51) Int. Cl.

| | | |
|---|---|---|
| *B32B 27/12* | (2006.01) | |
| *B32B 29/00* | (2006.01) | |
| *C08J 9/00* | (2006.01) | |
| *C08J 9/10* | (2006.01) | |
| *C08K 3/22* | (2006.01) | |
| *C08K 3/26* | (2006.01) | |
| *D06N 3/00* | (2006.01) | |
| *D06N 3/04* | (2006.01) | |
| *D06N 7/00* | (2006.01) | |
| *D21H 21/56* | (2006.01) | |
| *D21H 27/20* | (2006.01) | |

(52) U.S. Cl.
CPC ............ *D21H 21/56* (2013.01); *D21H 27/20* (2013.01); *B32B 2266/025* (2013.01); *C08J 2203/04* (2013.01); *C08J 2323/02* (2013.01); *C08J 2323/08* (2013.01); *C08K 2003/2241* (2013.01); *C08K 2003/265* (2013.01); *D06N 2203/042* (2013.01); *D06N 2205/04* (2013.01); *D06N 2211/063* (2013.01)

(56) References Cited

U.S. PATENT DOCUMENTS

| | | | |
|---|---|---|---|
| 5,407,617 | A | 4/1995 | Oppermann et al. |
| 2001/0013389 | A1 | 8/2001 | Fingal et al. |
| 2002/0081410 | A1 | 6/2002 | Buckwalter et al. |
| 2003/0108718 | A1 | 6/2003 | Simon et al. |
| 2006/0177640 | A1 | 8/2006 | Higashioji et al. |
| 2007/0249743 | A1 | 10/2007 | Sehanobish et al. |
| 2010/0143652 | A1 | 6/2010 | Stockton et al. |
| 2012/0108134 | A1 | 5/2012 | Chee et al. |

FOREIGN PATENT DOCUMENTS

| | | |
|---|---|---|
| JP | 2003-200513 A | 7/2003 |
| JP | 2006008782 A | 1/2006 |
| JP | 2007224485 A | 9/2007 |
| JP | 2008081885 A | 4/2008 |
| JP | 2011073279 A | 4/2011 |
| RU | 2211272 C2 | 8/2003 |
| RU | 2008143992 A | 5/2010 |
| RU | 2429285 C2 | 9/2011 |

OTHER PUBLICATIONS

Mark et al., Handbook of Physical Testing of Paper, vol. 1, Second Edition, Revised and Expanded, 2002, pp. 120 to 125.

Modulus of Elasticity—Young Modulus for some Common Materials, http://www.engineeringtoolbox.com/young-modulus-d_417.html, pp. 1-9, retrieved on Nov. 18, 2014.

Tensile properties of polymers, Exxon Mobil Chemicals, last accessed at http://exxonmobilchemical.com/en/productselector#/datatable on Apr. 6, 2020.

S. Timoshenko, Analysis of Bi-Metal Thermostats, Scientific Pater 178, Westinghouse Research Laboratory, Sep. 1925.

DuPont Elvax EVA resin for adhesives sealants and wax blends at https://www.nevicolor.it/produkte/polymer-suchen/dupont/elvax/documenti/elvax-adhesives-wax-blends.pdf.

Chen et al.: "Study on Decomposition Temperature of Blowing Agents," Journal of Zhejiang Institute of Science and Technology, vol. 17, No. 4, Dec. 2000, along with an English-language abstract.

Askeland, Donald R., Phulé, Pradeep P. (2006), The science and engineering of materials (5th ed.), Cengage Learning. p. 198.

COMPOSITE SHEET AND MANUFACTURING METHOD FOR A FOAMED DECORATIVE SHEET FREE OF PVC AND PLASTICIZERS

CROSS REFERENCE TO RELATED APPLICATIONS

This application is a divisional application of U.S. patent application Ser. No. 15/251,771, filed Aug. 30, 2016, which is a continuation application of international patent application PCT/EP2015/050975, filed Jan. 20, 2015, designating the United States and claiming priority from European application 14158061.3, filed Mar. 6, 2014, and the entire content of these applications is incorporated herein by reference.

TECHNICAL FIELD

The present invention relates to a composite sheet for producing decorative sheets and to a corresponding manufacturing method of the decorative sheets.

BACKGROUND

Decorative sheets having a composite sheet with a foamed plasticized polyvinyl chloride (PVC) layer on one side and paper or non-woven material on the other side are widely used today. One of the applications for these decorative sheets are wall covers. They are very popular due to their wear resistance, washability, and longevity as compared to natural paper-based wallcoverings, as well as due to their low cost. The current state of the art of mainstream vinyl wallcoverings production includes three major steps:
1. coating of a foamable composition layer or of several layers onto paper or a non-woven sheet,
2. printing on top of the foamable sheet, and
3. foaming the sheet and further processing like structure embossing, cutting, packing, et cetera.

Foaming is a very important and integral part of wall coverings production as it allows production of thicker layers at low cost. The wallcoverings are usually embossed, either mechanically or chemically, to create structure and to make the pattern more realistic and attractive.

The main drawback of choosing PVC as a material is that its production can have a negative environmental impact. Furthermore, to achieve the required properties, such as strength and flexibility, PVC must be mixed with stabilizing agents, plasticizers and solvents which are suspected of being harmful to health, and which can migrate to the room environment. In addition, PVC recycling or combustion is problematic due to formation of hydrochloric acid and low energy recovery.

Polyolefin (PO) materials are a viable and eco-friendly alternative to PVC and can be used plasticizer and solvent free. Polyolefin materials are widely used for example for food packaging and are approved for direct food contact. In addition, they can be recycled, or energy can be recovered by combustion. They can potentially provide the same advantages of vinyl wallcoverings without the ecological shortcoming of vinyl.

JP 2002096433 A discloses a flame-retardant wallpaper with excellent piling pressure resistance. The wallpaper includes a base layer, a foamed resin layer and a decorative layer. The foamed resin layer is made of an ethylene-vinyl acetate copolymer resin containing a foaming agent, an inorganic component and a flame retardant and the ethylene-vinyl acetate copolymer resin has a vinyl-acetate content of 20% to 22% and a melt flow rate of 45 to 80 g/10 min.

U.S. Pat. No. 5,407,617 A describes a process of manufacturing a floor and wall cover, which contains a foamed layer. The method includes the steps of scattering a powder mixture on a backing layer, then melting and smoothing the same, thereby forming a smoothed layer on the backing layer. The powder mixture includes 100 parts of thermoplastic polymer, 0-100 parts of a filler and 0.5-7 parts of a blowing agent.

With respect to the manufacturing process of a foamed decorative sheet, one drawback of known composite sheets is that significant curling occurs, which makes a production on larger scale impossible. Curling occurs due to the different thermal expansion of diverse materials and depends on the mechanical and thermal expansion properties of each layer, as well as on the individual layer thickness. Composite sheets consisting of two layers with a top layer made of, for example, plastic with a high thermal expansion property, and a bottom layer made of, for example, paper or fleece with a low thermal expansion property, are prone to curling during the heating-cooling circles in the wall cover production process.

Also, as it is known in the art, usually foamed wall covers are produced by printing on top of a foamable laminate prior to expansion. This is done because printing on top of a separate layer with subsequent lamination would be too expensive and printing on top of the foamed layer with current printing technologies is not possible as the foamed layer is not even and the substrate is too thick.

SUMMARY

One or more of the mentioned limitations of the state of art are overcome or at least reduced by the inventive composite sheet. The composite sheet includes or consists of (i) a base layer and (ii) a foamable layer (directly) bonded to the base layer. The foamable layer includes or consists of:
  100 parts by weight of a polyolefin material having an elastic modulus of <0.1 GPa;
  0.1-10 parts by weight of a foaming agent; and
  0-200 parts by weight of additives.

The foamable layer has a thickness of 0.05 to 0.3 mm which corresponds roughly to 50 to 300° g/m$^2$.

Different multilayer structures can be potentially used in the foamable plastic layer. For example, in case of lamination, the layer between the substrate and foamable film can be made without a foaming agent and with use of recycled materials. Also, the foamable layer can be made of two layers—a bottom layer containing recycled materials and a top skin layer containing white pigment and being suitable for printing.

Surprisingly, it has been found that by using a specific group of plastics, it is possible to minimize the curling effect and to produce a curling-free composite sheet for manufacturing a foamed decorative sheet of large dimensions and in a continuous manner.

The base layer should have a higher dimensional stability compared to the foamable layer. The base layer has an elastic modulus of >1 GPa, shows a shrinkage/expansion of less than 2% in a temperature range of 0° C. to 220° C., and has a thickness of 0.05 to 0.15 mm which corresponds roughly to 50 to 150 g/m$^2$. As a consequence of the base layer stability, the dimensional stability of the composite sheet during the manufacturing process of the foamed wall cover is improved. This is necessary for any printing process since otherwise the foam would expand in all three dimensions during foaming resulting in an uncontrolled or poorly controlled print register. In case of a dimensionally stable and stiff base layer with high elastic modulus and a dimensionally unstable but soft foamable polyolefin layer it is possible to obtain a composite sheet which expands only in the Z direction during foaming.

Suitable materials for the base layer can be paper or paper-like materials, non-woven materials, that is, fleece, woven fabrics, non-woven fabrics and plastic foils. Preferably, paper or fleece is used.

The foamable layer has a thickness of 0.05 to 0.3 mm. It includes or consists of polyolefin material, a foaming agent, and optionally, additives.

A polyolefin is any of a class of polymers produced from an olefin or a combination of different olefins such as ethylene, propylene, butene, pentene, hexene and octene. Here, the term polyolefin also includes copolymers of olefins with other unsaturated monomers like for example vinyl acetate. Polyolefins have recently been used broadly due to their excellent chemical and physical properties as well as their cost-effective nature. The polyolefins of the present invention preferably have an average molecular weight of 10000 to 300000 and their melting temperature should be below the decomposition range of the foaming agent, preferably in the range of 50° C. to 110° C.

Further, the polyolefins should have an elastic modulus of <0.1 GPa and are preferably selected from the group consisting of thermoplastic elastomer polyolefins (also known as thermoplastic elastomer polyolefin blends TPE-o), ethylene vinyl acetate copolymers, atactic polypropylene polymers or mixtures thereof. Thermoplastic elastomer polyolefins are produced by methods known in the art, for example, by copolymerization of ethylene with butene, hexene, octene or propylene using metallocene or other catalyst. In this way low density and low crystallinity, soft polyolefins are produced. The borderline between low density polyethylene (or very low-density polyethylene) and thermoplastic polyolefin elastomer is not well defined, as both are copolymers of ethylene. However, any polyolefin copolymer can be used in the current invention as long as its elastic modulus is below 0.1 GPa. The expression thermoplastic polyolefin elastomer is used herein for any polyolefin copolymer with elastic modulus below 0.1 GPa.

According to another aspect of the invention, polyolefin blends may be used as polyolefin material including polyolefins with an elastic modulus >0.1 GPa, such as LDPE (low density polyethylene), HDPE (high density polyethylene), and PP (polypropylene), may be used as long as the total elastic modulus of the polyolefin blend is <0.1 GPa. Hence, the polyolefin material may be a polyolefin blend including polyolefins with an elastic modulus >0.1 GPa and polyolefins with an elastic modulus <0.1 GPa, such that the total elastic modulus of the polyolefin blend is <0.1 GPa.

The elastic modulus is a mathematical description of an object or substance's tendency to be deformed elastically (that is, non-permanently) when a force is applied to it. The elastic modulus of an object is defined as the slope of its stress-strain curve in the elastic deformation region. See Askeland, Donald R., Phulé, Pradeep P. (2006), The science and engineering of materials (5th ed.), Cengage Learning. p. 198.

Thermoplastic elastomers (TPE) are copolymers or a mix of polymers, usually a plastic and a rubber, with thermoplastic and elastomeric properties (also defined as elastomers including a thermo-reversible network). In particular, the polyolefin material may be a polyolefin blend (TPE-o). Miscible rubbers are natural rubber, ethylene-propylene rubber, butyl rubber, polyisobutylene, polybutadiene, polyisoprene, styrene/butydiene rubber, et cetera.

Preferably, the polyolefins are low density polyolefins with a density of <0.96 g/cm$^3$, more preferably <0.90 g/cm$^3$. Furthermore, the polyolefins may have a crystallinity of <40%, more preferably <25%.

As used herein the term "foaming agent" means a heat-decomposable agent which is liquid or solid at room temperature, has a higher decomposition temperature than the melting temperature of the polyolefin (or at least one compound of the polyolefin blend) and when heated to a temperature above the decomposition temperature, decomposes while evolving a gas such as nitrogen, carbon dioxide or ammonia. The foaming agent may be selected from the group consisting of azodicarbonamide and/or metal salts thereof, hydrazodicarbonamide, sodium bicarbonate, trihydrazino-sym-triazine, pp'-oxybis-benzenesulfonylhydrazide, dinitroso-pentamethylene-tetramine, azobisisobutylodinitrile, p-toluenesulfonylhydrazide, and bisbenzenesulfonylhydrazide. Preferably, azodicarbonamide or sodium bicarbonate is used.

The amount of the foaming agent can be determined according to the desired expansion factor. The preferred amount of foaming agent in the composition forming the foamable layer is in the range of 1 to 5 parts by weight.

The decomposition temperature of the foaming agents is preferably in the range of 120° C. to 200° C.

Beside the polyolefin material and the foaming agent, the foamable layer may also include additives. As used herein, the term "additives" means substances which are added to the foamable layer composition in order to achieve certain properties of the foamable layer. These additives can be very different in their nature. Possible additives are catalysts, pigments, fillers, matting agents, microbial agents, UV stabilizers, fire retardants and release compounds.

For example, to lower the temperature at which the foaming agent decomposes a catalyst may be added as well known in the art. Such a catalyst may be selected from the group consisting of zinc oxide, barium ricinoleate, tin methoxy maleate, hydrated calcium silicate, calcium stearate, zinc stearate, lead acetate, zinc laurate, zinc octonoate and cadmium amyl phosphite.

In order to decrease the thermal expansion coefficient of the polyolefin material, especially thermoplastic elastomer polyolefins, it is possible to add additives like fillers, for example, mineral fillers such as talk or chalk, that have a significantly lower thermal expansion as compared to the polymer.

The total amount of additives should be 0 to 200 parts by weight, preferably 50 to 80 parts by weight.

The present invention is also directed to a method for producing a foamed decorative sheet, especially a foamed wall cover. The method includes the steps of:

(a) providing a composite sheet as mentioned above;
(b) optionally, printing on the composite sheet; and
(c) foaming of the composite sheet.

According to step (a) there is provided the inventive composite sheet including the base layer and foamable layer. The foamable layer can be manufactured by different methods known in the art. One possibility is that its individual compounds are mixed and formed to a sheet by using calendar rolls, sheet dies, et cetera. Afterwards, the film may then be assembled directly to the base layer by melt or chemical lamination.

After the assembly of the foamable layer onto the base layer optionally additional treatments known in the art can be performed such as cross-linking, coloring, surface treatment, et cetera. In order to improve film foaming, sufficient melt strength is required as known in the art. Cross-linking can be used to improve melt strength. Cross-linking can be carried out by using, for example, ionizing radiation or by using a cross-linking agent. Preferably cross-linking using ionizing radiation is conducted by electron beam with 100-300 kV voltage and dosage of 10-200 kGy, preferably 10-100 kGy. Two different electron beams operating at low and high voltage can be applied as known in the art, in order to improve foam surface structure.

Alternatively, cross-linking can be performed by employing cross-linking agents that decompose to radicals at elevated temperature. Specific examples of cross-linking agents are organic peroxides that include various classes such as dicumyl peroxide, alkyl peroxides, di-tert-butyl peroxide and aralkyl peroxides.

Coloring of the composite sheet can be carried out by printing methods such as gravure-, flexo screen- or inkjet printing (step (b)).

Additional surface treatment can be carried out by methods such as coronary treatment.

In step (c), the composite sheet is foamed to form the foamed decorative sheet, respectively foamed wall cover. The temperature during step (c) is preferably in the range of 120° C. to 210° C. depending on the used foaming agent and catalyst.

After foaming the foamed sheet can be embossed mechanically by a structured cooled roller or embossed chemically using inhibitor systems as known in the art.

The composite sheet can be produced in a continuous mode with width of 0.5 to 3.0 m.

BRIEF DESCRIPTION OF THE DRAWINGS

The invention will now be described with reference to the drawings wherein.

DESCRIPTION OF EXEMPLARY EMBODIMENTS

Exemplary embodiments of the invention will now be described.

A major problem of producing wall covers using composite sheets including a base layer and a foamable layer directly bonded to the base layer is curling. In particular, producing wall covers with a width of 0.5 to 3 m is nearly impossible when significant curling occurs. In principle, the effect is based on different thermal expansion properties of the base layer and foamable layer. Plastics are well known for their high thermal expansion rate, moreover crystallization that takes place upon cooling further increases shrinkage. However, heating is an inevitable process of the wall cover production, for example during coating of the foamable layer on the base layer, after printing of top ink layers or foaming in a heating channel. During the phase of subsequent cooling, the top polyolefin layer may contract significantly more than the base layer. In that case, curling occurs as illustrated in FIG. 1.

Figure 1:
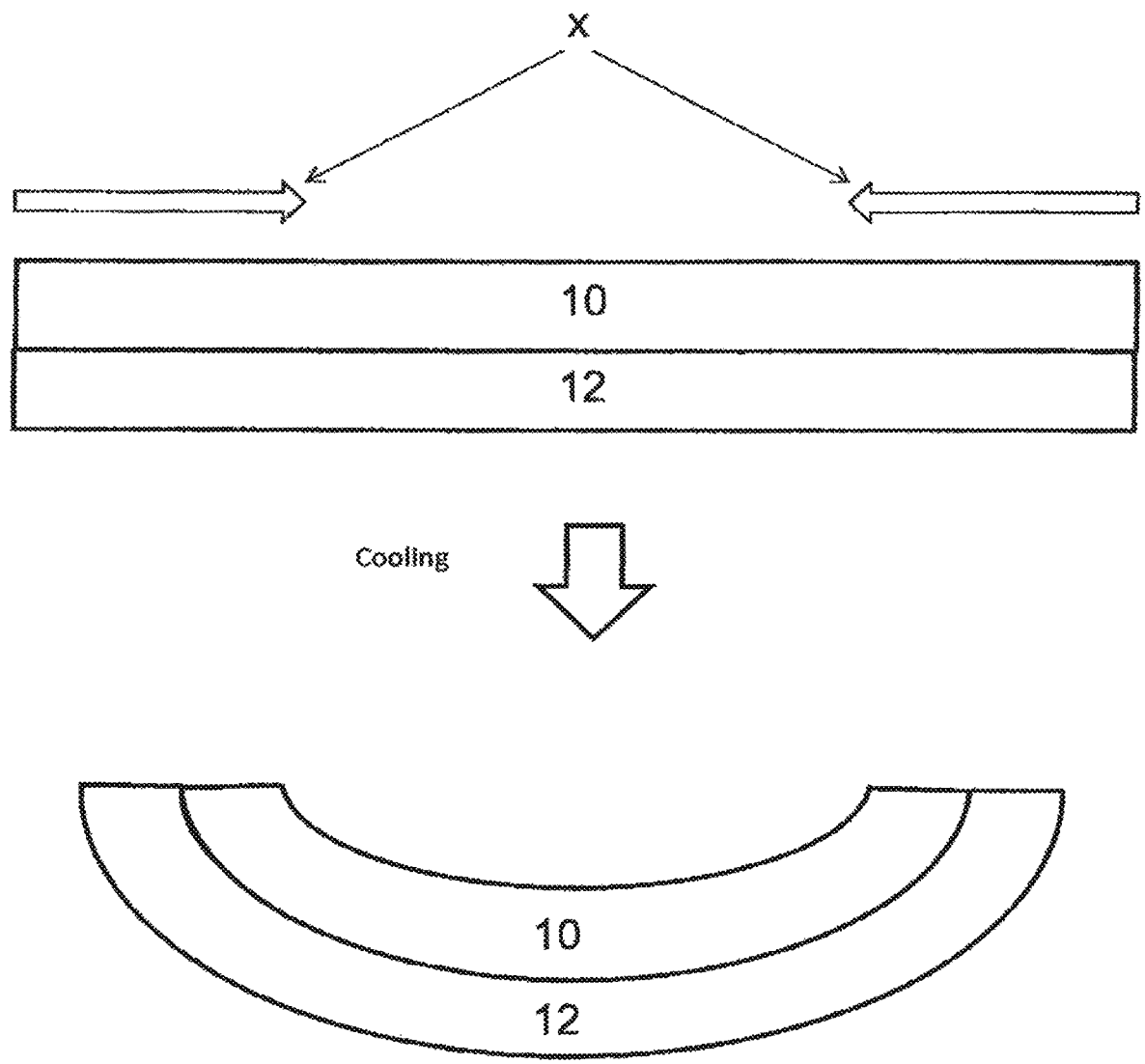
FIG. 1 shows the curling of a laminate.

Referring to FIG. 1, the reference number 10 represents the foamable layer with a high thermal expansion/contraction property and reference number 12 represents the base layer with a low thermal expansion/contraction property. X represents the curling that occurs during the phase of cooling.

The curling depends on each layer's mechanical and thermal properties as well as on the thicknesses from the well-known theories of laminate thermal stresses. In the well-known Timoshenko's analytical solution of a beam laminate consisting of two layers (FIG. 1 with top layer 10 and bottom layer 12) the beam had no curling at the temperature $T_0$. When the temperature changed to T, the beam's curvature $k_b$ became:

$$k_b = \frac{6\Delta T \Delta \alpha (1 + m^2)}{h\left(3(1+m)^2 + (1+mn)\left(m^2 + \frac{1}{mn}\right)\right)}$$

wherein $m=t_1/t_2$, the elastic modulus ratio $n=E_1/E_2$, the total thickness $h=t_1+t_2$, the temperature change $\Delta T=T-T_0$, and the thermal coefficient mismatch $\Delta\alpha=\alpha_2-\alpha_1$.

The equation can be used to study the dependence on the curvature radius and hence curling, on film thickness, on elastic modulus of each layer, on the thermal expansion coefficient, et cetera. When the elastic modulus ratio $E_1/E_2$ is less than 0.05, the curvature radius and hence curling rapidly decreases with a decreasing $E_1/E_2$ ratio. Therefore, soft top layers with an elastic modulus <0.1 GPa are needed. Standard polyolefins like LDPE and HDPE (high-density polyethylene) or PP (polypropylene) have an even higher modulus (>1 GPa) and are hence worse in curling. Therefore, with standard polyolefins, it is practically impossible to get the needed coating thickness without curling.

However, by using specific groups of soft plastics, it is possible to minimize the curling effect and to produce curling-free laminate. This group of soft plastics includes thermoplastic elastomer polyolefins, ethylene vinyl acetate copolymers, atactic polypropylene polymers or mixtures thereof with modulus <0.1 GPa.

Different composite sheets have been manufactured by a melt processing of a foamable layer (directly) on a base layer as follows:

The base sheet was made of paper or non-woven material, had a thickness of 0.1 mm, an elastic modulus of >1 GPa, and a shrinkage/expansion of less than 2% up to 220° C.

Example 1

The foamable layer has been made of polyolefin material having an elastic modulus of <0.1 GPa. The components of the foamable layer were mixed at 140° C., 60 RPM. Then the foamable layer has been laminated on paper at 140° C.

More specifically the foamable layer consisted of:

| | |
|---|---|
| Ethylene-octene copolymer, melt flow index 5, modulus 0.011 GPa | 100 parts by weight |

| Azodicarbonamide | 5 parts by weight |
| ZnO | 1 parts by weight |

The layer had a thickness of 0.15 mm and had good adhesion to the substrate. No curling occurred after cooling to room temperature.

Comparative Example 1

The foamable layer consisted of:

| LDPE, melt flow index 10, modulus 0.32 GPa | 100 parts by weight |
| Azodicarbonamide | 5 parts by weight |
| ZnO | 1 parts by weight |

The layer had a thickness of 0.15 mm and had good adhesion to the substrate. Some curling occurred after cooling to room temperature.

Comparative Example 2

The foamable layer consisted of:

| HDPE, melt flow index 3, modulus 1.5 GPa | 100 parts by weight |
| Azodicarbonamide | 5 parts by weight |
| ZnO | 1 parts by weight |

The layer had a thickness of 0.15 mm and had good adhesion to the substrate. Significant curling occurred after cooling to room temperature.

Figure 2:
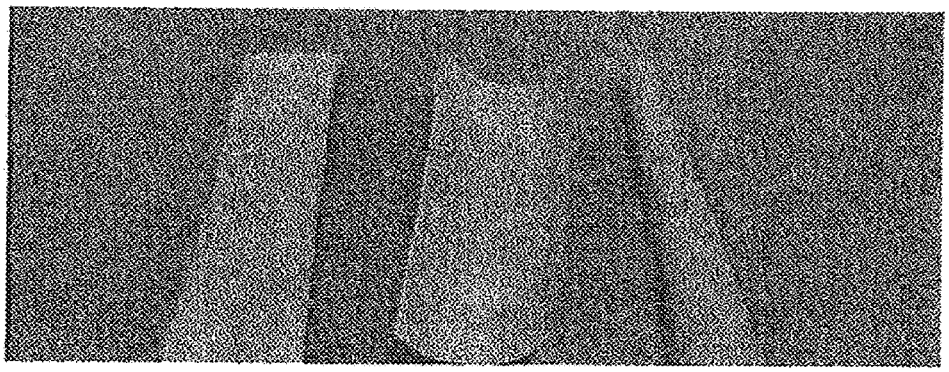
FIG. 2 is a photograph showing the curling of a composite sheet with a foamable layer made of a polyolefin material having an elastic modulus of <0.1 GPa (left) and two composite sheets with a foamable layer made of a polyolefin material having an elastic modulus of >0.1 GPa.

FIG. 2 shows three different composite sheets that have been manufactured as described above. The composite sheet of Example 1 with a foamable layer made of a polyolefin material having an elastic modulus of <0.1 GPa showed no curling (left). For comparative purposes, two composite sheets with a foamable layer made of a polyolefin material having an elastic modulus of >0.1 GPa were manufactured (comparative Example 1 and comparative Example 2). In contrast to the curling-free composite sheet on the left side, both of the comparative sheets showed a characteristic curling (medium curling of comparative Example 1 in the center and extreme curling of comparative Example 2 on the right-hand side of FIG. 2).

The Examples show that for obtaining a composite sheet without curling, the top layer has to be made from a soft plastic with an elastic modulus <0.1 GPa with a thermal expansion coefficient that is as low as possible.

The samples were cross-linked by electron beam radiation at 160 kV, 10 mA with variable dosage 20-100 kGy and foamed at 225° C. All samples showed foaming.

Example 2

The foamable layer consisted of:

| Ethylene-octene copolymer, melt flow index 5, modulus 0.011 GPa | 100 parts by weight |
| Calcium carbonate | 60 parts by weight |
| Activated azodicarbonamide | 5 parts by weight |
| Titanium dioxide | 10 parts by weight |
| Dicumyl peroxide | 1 parts by weight |

Figure 3A:
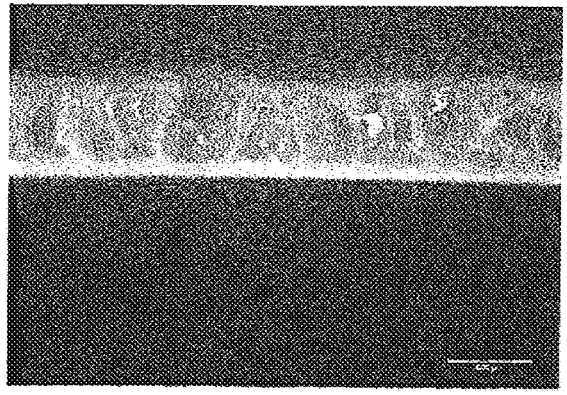
FIG. 3A is a microscope view of foam cross-section of a foamable layer with an elastic modulus <0.1 GPa.
Figure 3B:
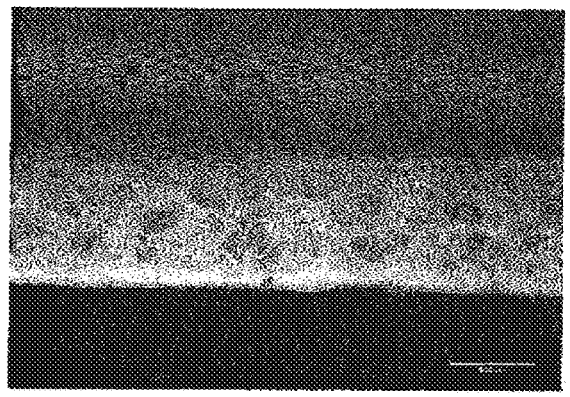
FIG. 3B is a microscope view of foam cross-section of a plasticized PVC composite sheet.

The layer thickness was around 0.15 mm. In the next step, the layer was laminated to the base layer and cross-linked at 170° C. for 1 min. The layer was printed on a laboratory gravure printing machine with water-based ink suitable for polyolefins surface and foamed in a convection oven at 1 min 205° C. FIGS. 3A and 3B show that the composite sheet including the foamable layer with <0.1 GPa (FIG. 3A) exhibited good foaming that is comparable to PVC based foams used for wall cover (FIG. 3B).

Example 3

The foamable layer consisted of:

| Ethylene-octene copolymer, melt flow index 17, modulus 0.06 GPa | 100 parts by weight |
| LDPE, melt flow index 10, modulus 0.32 GPa | 10 parts by weight |
| Calcium carbonate | 60 parts by weight |
| Azodicarbonamide | 5 parts by weight |
| Zinc oxide | 1 parts by weight |

Figure 4A:
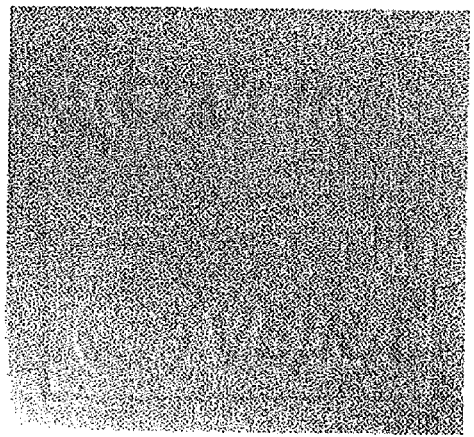
FIG. 4A is a photograph of embossed foam of a foamable layer with an elastic modulus <0.1 GPa; and, FIG. 4B is a photograph of embossed foam of a plasticized PVC composite sheet.
Figure 4B:
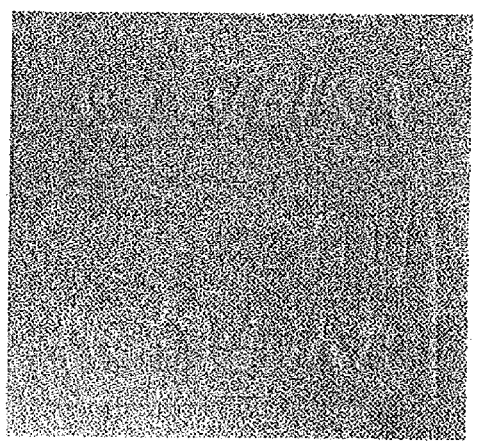

The layer with 0.2 mm thickness was laminated to 0.1 mm non-woven material and foamed in a convection oven at 1 min 215° C. Afterwards, it was hot-embossed at about 140° C. FIGS. 4A and 4B show that the embossing structure of the composite sheet including the foamable layer with <0.1 GPa (FIG. 4A) was comparable to PVC-composite sheets (FIG. 4B).

It is understood that the foregoing description is that of the preferred embodiments of the invention and that various changes and modifications may be made thereto without departing from the spirit and scope of the invention as defined in the appended claims.

What is claimed is:

1. A method for producing a foamed decorative sheet, the method comprising:
   melt processing a foamable layer on a base layer to form a curling-free composite sheet, the base layer being made of a paper or non-woven material, the paper or non-woven material having a first thickness of 0.1 mm, a first elastic modulus of >1 GPa, and showing a change of dimensions of less than 2% when heated from 0° C. to 220° C. and subsequently cooled to 0° C., the foamable layer having a second thickness of 0.15 mm, being made of components mixed at 140° C., 60 RPM, and subsequently being laminated on the paper or non-woven material at 140° C., the components consisting of 100 parts by weight of an Ethylene-octene copolymer, having a melt flow index of 5, and a second elastic modulus of 0.011 GPa, 5 parts by weight of Azodicarbonamide, and 1 part by weight of ZnO;
   printing on the curling-free composite sheet; and
   foaming of the curling-free composite sheet.

2. The method of claim 1, wherein a ratio of the second elastic modulus of the foamable layer and the first elastic modulus of the base layer is less than 0.05 to prevent curling of the curling-free composite sheet during heating-cooling circles in a wall cover production process.

3. The method of claim 1, further comprising:
performing cross-linking of the foamable layer with at least one of ionizing radiation and employing a cross-linking agent,
wherein the ionizing radiation is conducted by an electron beam with 100 to 300 kV voltage and a dosage of 10 to 200 kGy, and
wherein the cross-linking agents decompose to radicals at an elevated temperature.

4. The method of claim 1, wherein printing on the curling-free composite sheet includes at least one of gravure printing, flexo screen printing, inkjet printing, and coronary treatment.

5. The method of claim 1, wherein foaming of the curling-free composite sheet is performed at a temperature between 120° C. and 210° C., and
wherein the temperature depends on the foaming agent.

6. The method of claim 1, wherein the curling-free composite sheet is produced in a continuous mode with a width between 0.5 and 3.0 meters.

7. The method of claim 1, wherein the foamable layer further includes additives selected from the group consisting of catalysts, pigments, fillers, matting agents, microbial agents, UV stabilizers, fire retardants and release compounds.

8. The method of claim 7, wherein the additives include a catalyst, and
wherein the catalyst is selected from the group consisting of barium ricinoleate, tin methoxy maleate, hydrated calcium silicate, calcium stearate, zinc stearate, lead acetate, zinc laurate, zinc octonoate, and cadmium amyl phosphite.

9. The method of claim 1, wherein the foamed decorative sheet is a wall cover.

* * * * *